June 1, 1937.                F. W. KIRBY                2,082,249
MANURE SPREADER
Filed Dec. 24, 1935
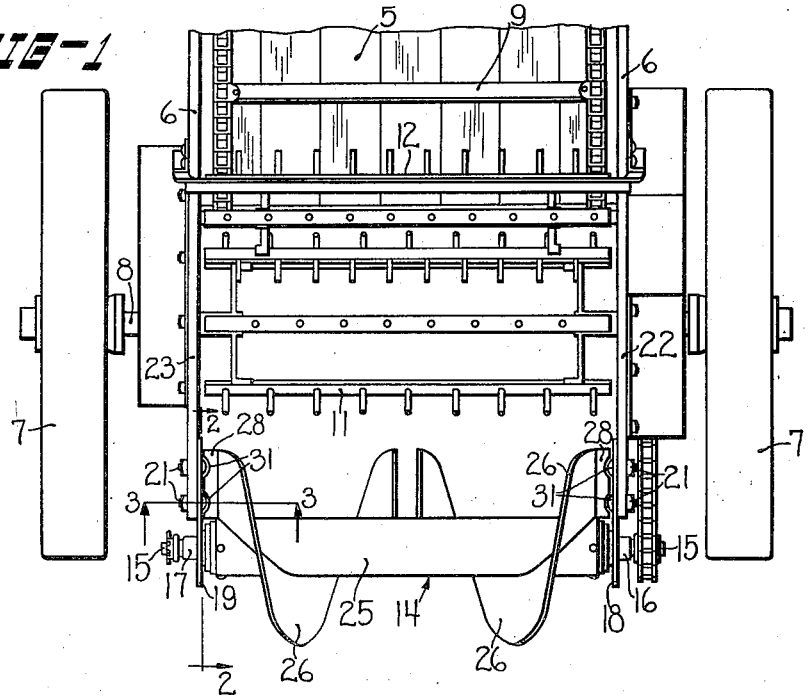
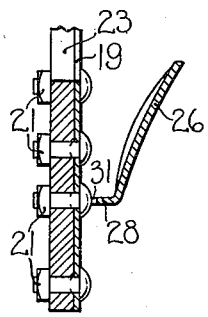
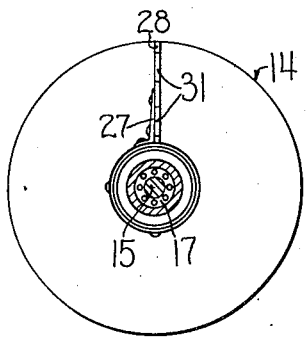
INVENTOR
Frederick W. Kirby.
BY
Brown, Jackson, Boettcher & Dienner
ATTORNEYS.

Patented June 1, 1937

2,082,249

UNITED STATES PATENT OFFICE 2,082,249

MANURE SPREADER

Frederick W. Kirby, Moline, Ill., assignor to Deere & Company, Moline, Ill., a corporation of Illinois Application December 24, 1935, Serial No. 56,065

3 Claims. (Cl. 275—6)

The present invention relates to fertilizer distributors of the type comprising a vehicle body mounted on front and rear wheels, beating mechanism and a wide spread device mounted adjacent the rear end of the vehicle body, and a traveling conveyor, the upper course of which feeds the contents of the vehicle body gradually rearwardly to the distributing apparatus. More particularly the present invention has to do with the wide spread device and the scrapers that are provided on the outer ends thereof whereby any accumulations of manure on the side supporting structures of the manure spreader adjacent such outer ends will be scraped off, so that the operation of the wide spread device will not be hindered in any manner.

It has been the general practice heretofore to form the scrapers separately and to secure them on the transverse shaft of the wide spread device, one of such scrapers being attached at each end of the shaft adjacent to the inner portion of the side supporting structure of the spreader. Such a construction is illustrated and described in the patent to Carl H. Gamble, No. 1,838,755, dated December 29, 1931.

It has been found, however, that when such separately formed scrapers are applied in the manner suggested in the Gamble patent to the outer ends of the supporting shaft of a wide spread device that is of the statically and dynamically balanced type as illustrated in the drawing, such scrapers will throw the wide spread device considerably out of balance and so reduce materially the efficiency that has been obtained by so balancing it, which of course is objectionable. This is so, because when separate scrapers such as those shown in the Gamble patent are provided it is necessary to use a substantial bracket not only to fasten the scraper to the drum, but also to give it the required stiffness throughout its entire length. A statically and dynamically balanced wide spread device is fully illustrated and described in the patent to Starley S. Swanson, No. 2,015,245, dated September 24, 1935, to which reference may be had if desired.

With the above in view it is the principal object of the present invention to provide scrapers for the outer ends of a statically and dynamically balanced wide spread device that will not throw the wide spread device out of balance to such an extent that the static and dynamic balance thereof will be appreciably affected and so destroy to a marked extent the efficiency obtained by so balancing it.

Another object of the present invention is to form the scrapers on the outer ends of the wide spread device as an integral part of the oppositely directed helicoid vanes thereof, thereby eliminating the cost of separate scrapers and also eliminating the use of means for securing such separate scrapers to the vanes and the labor involved in so securing them thereto.

In the drawing,—

Figure 1 is a top plan view of the rear portion of a conventional type of manure spreader equipped with my improvements;

Figure 2 is a vertical longitudinal sectional view on an enlarged scale through one end of the shaft of the wide spread device taken on the plane of the line 2—2 of Figure 1; and Figure 3 is a vertical transverse sectional view on an enlarged scale taken on the plane of the line 3—3 of Figure 1.

Referring to the drawing, the manure spreader fragmentarily illustrated is of the conventional type having a body comprising a load carrying bed 5 having side walls 6, the rear end of the bed being supported between two traction wheels 7 mounted on an axle 8 and provided with the usual ratchets to cause rotation of the axle upon forward movement of the spreader.

The material to be distributed is carried in the body of the spreader or distributor and is caused to travel gradually rearwardly therein when the machine is in operation, either by an endless conveyor or by an apron of more or less conventional construction, indicated as an entirety by the reference numeral 9. The conveyor 9 operates in the lower portion of the body and is moved rearwardly by power derived from the rear wheels 7 in any suitable manner, as by the mechanism illustrated and described in said Carl H. Gamble patent above mentioned, or by any other suitable means.

The distributor is provided with a main beater 11, an auxiliary beater 12, and a wide spread device which is indicated as an entirety by the numeral 14. In the illustrated construction the beaters and the wide spread device are driven by power derived from the rear wheels 7 in any suitable manner, as by the mechanism illustrated and described in said Carl H. Gamble patent above mentioned, but it is to be understood that such beaters and wide spread device may be driven by power derived through a power take-off shaft from a tractor motor as in the construction illustrated in the above mentioned Swanson patent.

The wide spread device 14 in the present construction is of the statically and dynamically balanced type illustrated in the above mentioned Swanson patent, and comprises the usual supporting shaft 15 journaled at its opposite ends in bearings 16 and 17 supported in suitable perforations provided therefor in supporting plates 18 and 19, respectively, extending rearwardly from and suitably secured, as by bolts 21, to the frame members or beams 22 and 23, respectively, which extend rearwardly from opposite sides of the vehicle body. The wide spread device also includes a drum member 25 preferably formed of sheet metal which is supported on the shaft 15 and secured thereto in any suitable manner, said drum being provided with two oppositely directed helicoid vanes 26, each of which subtends exactly 360° or a multiple thereof between its ends. These vanes are fixedly mounted on the drum 25 by brackets 27 as shown in Figure 2, with their inner ends and also their outer ends lying on the same side of the axis of the drum 25 and in the same axial plane, thus providing a statically and dynamically balanced wide spread device, all of which is fully described in the Swanson patent above mentioned, and it is believed, therefore, that further description thereof is unnecessary herein.

Coming now to the construction with which my present invention is more particularly concerned, as above mentioned, it is desirable to provide a scraper at each end of the wide spread device whereby any accumulations of manure on the side supporting structure adjacent the ends of the wide spread device will be scraped off so that the operation of the wide spread device will not be interfered with or hindered in any manner and may operate freely; and, furthermore, it is of course desirable in a wide spread device of the statically and dynamically balanced type herein illustrated to provide scrapers that will not to any appreciable extent destroy the balance thereof.

To this end, therefore, each of the helicoid vanes of the wide spread device adjacent its outer end is bent to form a scraping member or portion 28 that extends at right angles or perpendicular to the adjacent side frame member or beam 22 or 23, and in the same radial plane as the inner end of the helicoid vane and on the same side of the axis of rotation of the shaft 15. This construction avoids the necessity of providing the separate brackets on the drum on which to secure the scrapers, which brackets are of such weight as to throw the wide spread out of balance to a considerable extent. Also, by forming the scrapers of the material at the outer ends of the helicoid vanes, rather than as separate parts, excess weight which would otherwise be required to secure the overlap necessary for firm attachment is avoided. In the present construction the thickness of the scraper may be much thinner than in the case of separately formed scrapers due to the fact that the scraper is rigidly supported throughout its entire length, radially of the beater, as it is an integral part of the helicoid vane. The thickness of the sheet of metal forming the helicoid vane is sufficient, which thus makes it possible to merely form the scraper by bending the end of the vane over into the position above mentioned. By thus forming the scrapers at the ends of the wide spread device the static and dynamic balance thereof is not appreciably affected.

In this connection it may be well to point out that if greater accuracy of balance than that obtained by the illustrated construction was desired, it could be obtained by stopping the outer end of the helicoid vane short of the plane of the inner end of the spiral and using that amount of metal, which would otherwise be needed to complete the spiral, as a scraper; or in other words by merely bending the outer one inch or so of the spiral into a radial plane. This would not disturb the static and dynamic balance sufficiently to have any practical effect at the speeds at which a wide spread device is operated.

The outer edge of each of the scraping members 28 of the vanes 26 is provided with notches or recessed portions 31 so that such scraper members will clear the heads of the bolts 21 that secure the supporting plates 18 and 19 to the side frame members or beams 22, 23, respectively, as shown in Figures 1 and 3. While in the illustrated construction the scraper members 28 are shown as provided with two of such notches 31, it is of course to be understood that the number of notches depends on the number of bolt heads the scraper member has to clear in the operation of the wide spread device. By the present construction, therefore, scrapers are provided that will not cause an appreciable unbalancing of a statically and dynamically balanced wide spread device as would be the case if separate scrapers such as those above mentioned were provided on the outer ends of the vanes, and also the cost of providing separate scrapers to be attached to the outer ends of a wide spread device is also eliminated.

I claim:

1. A substantially statically and dynamically balanced wide spread device for manure spreaders comprising, in combination, a pair of oppositely directed helicoid vanes, and a scraper for each end of said device, said scrapers being formed integral with the outer ends of said vanes and disposed in a position relative to the inner ends of the vanes so that the static and dynamic balance of the wide spread device is secured and retained.

2. A substantially statically and dynamically balanced wide spread device for manure spreaders comprising, in combination, a pair of oppositely directed helicoid vanes, said vanes adjacent their outer ends being bent to form scrapers, said scrapers lying substantially in the same radial plane as the inner ends of said vanes and on the same side of the axis of rotation of said device.

3. A substantially statically and dynamically balanced wide spread device for manure spreaders comprising, in combination, a pair of oppositely directed helicoid vanes, and a scraper for each end of said device, said scrapers being disposed at the outer ends of said vanes and positioned with respect to the inner ends of the vanes and to the axis of rotation of said device so that the static and dynamic balance of the latter is secured and retained.

FREDERICK W. KIRBY.